(12) United States Patent
Zeng et al.

(10) Patent No.: US 11,646,568 B2
(45) Date of Patent: May 9, 2023

(54) OVER-VOLTAGE PROTECTION METHOD AND DEVICE CROSS-REFERENCES TO RELATED APPLICATION

(71) Applicants: CHONGQING HKC OPTOELECTRONICS TECHNOLOGY CO.,LTD., Chongqing (CN); HKC CORPORATION LIMITED, Shenzhen (CN)

(72) Inventors: Dekang Zeng, Chongqing (CN); Shuixiu Hu, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/707,908

(22) Filed: Mar. 29, 2022

(65) Prior Publication Data
US 2022/0224102 A1   Jul. 14, 2022

Related U.S. Application Data

(62) Division of application No. 17/042,932, filed on Sep. 29, 2020, now Pat. No. 11,322,928.

(51) Int. Cl.
*H02H 3/20* (2006.01)
*H02H 3/027* (2006.01)
*H02H 7/00* (2006.01)

(52) U.S. Cl.
CPC ............. *H02H 3/20* (2013.01); *H02H 3/027* (2013.01); *H02H 7/008* (2013.01)

(58) Field of Classification Search
CPC .......... H02H 3/20; H02H 3/027; H02H 3/247; H02H 9/042; H02H 7/008; H02H 1/04
See application file for complete search history.

(56) References Cited

U.S. PATENT DOCUMENTS

| 2011/0134577 A1* | 6/2011 | Skarp | H02H 9/042 361/91.2 |
| 2015/0303685 A1* | 10/2015 | Wang | H02M 1/32 323/271 |

* cited by examiner

*Primary Examiner* — Bryan R Perez

(57) ABSTRACT

Embodiments of the present disclosure provide an over-voltage protection method, an over-voltage protection device and a display device. When the voltage value of the output signal is greater than the first preset voltage threshold, it is determined whether the voltage value of the output signal meets the preset over-voltage protection condition. If the voltage value of the output signal is detected to meet the preset over-voltage protection condition, the first control signal is output to stop output of the output signal or lower the voltage value of the output signal.

10 Claims, 4 Drawing Sheets

OVER-VOLTAGE PROTECTION METHOD AND DEVICE CROSS-REFERENCES TO RELATED APPLICATION

CROSS-REFERENCES TO RELATED APPLICATION

This application is a division of U.S. patent application Ser. No. 17/042,932 filed Sep. 29, 2020, which is hereby incorporated by reference herein in its entirety.

FIELD OF THE DISCLOSURE

The embodiments of the present application relate to the field of electronic technologies, and in particular, to over-voltage protection method, over-voltage protection device, and display device.

DESCRIPTION OF RELATED ART

The description herein are merely illustrative of the technical background associated with the present disclosure and do not necessarily constitute prior art. In order to protect the back-end electronic components from damage due to excessive output voltage, an over-voltage protection mechanism is usually arranged at the voltage output terminal, so that the output voltage can be turned off when the output voltage is too high. However, in the existing over-voltage protection, the voltage output is usually turned off after the output voltage exceeds the threshold voltage, and the false shutdown due to external noise interference cannot be avoided, which greatly affects the stability of the back-end circuit.

For example, a display panel usually needs different power supply voltages according to various functions of the function circuits. These power supply voltages may be provided by a power management chip. In actual operation, the output voltage would be too high due to the influence of the outside environment or the load, if it is not protected in time it will affect the normal display of the display panel or even burn out the display panel. Therefore, the power management chip in the display panel is usually provided with an over-voltage circuit. When the output voltage of the power management chip reaches the shutdown threshold, the over-voltage protection is activated to turn off the voltage output.

BRIEF SUMMARY OF THE DISCLOSURE

In the existing over-voltage protection, the voltage output is usually turned off after the output voltage exceeds the threshold voltage, and the false shutdown due to external noise interference cannot be avoided, which greatly affects the stability of the back-end circuit.

One object of the present disclosure is to provide an over-voltage protection method achieving the purpose including, but not limited to, avoiding the false shutdown due to external noise interference and improving the stability of the back-end circuit.

In an embodiment of the present disclosure, it is provided an over-voltage protection method, comprising:

determining whether a voltage value of an output signal is greater than a first preset voltage threshold;

detecting, within a present time range, whether the voltage value of the output signal meets a preset over-voltage protection condition in the case that the voltage value of the output signal is greater than the first preset voltage threshold; and outputting a first control signal to stop output of the output signal or to lower the voltage value of the output signal in the case that it is detected, within the preset time range, that the voltage value of the output signal meets the preset over-voltage protection condition.

In an embodiment, the step of detecting, within a present time range, whether the voltage value of the output signal meets a preset over-voltage protection condition comprises:

dividing the preset time range into n counting cycles, where n is an integer greater than 1;

determining whether the voltage value of the output signal in each of the counting cycles is greater than the first preset voltage threshold; and determining that the voltage value of the output signal meets the preset over-voltage protection condition in the case that the voltage value of the output signal in each of the counting cycles is greater than the first preset voltage threshold.

In an embodiment, the step of detecting, within a present time range, whether the voltage value of the output signal meets a preset over-voltage protection condition comprises:

dividing the preset time range into n counting cycles, where n is an integer greater than 1;

detecting whether the voltage value of the output signal is greater than the first preset voltage threshold in each of the counting cycles;

counting the counting cycles and outputting a count signal indicating the number of the counting cycles during which the voltage value of the output signal is greater than the first preset voltage threshold; and determined that the voltage value of the output signal meets the preset over-voltage protection condition in the case that a value of the count signal is greater than a preset over-voltage period threshold.

In an embodiment, the output signal is a voltage signal output from a signal output circuit, and the first control signal is further configured to control the signal output circuit to trigger an over-voltage protection operation.

In an embodiment, the over-voltage protection method further comprises:

receiving the output signal, and outputting a second control signal in the case that the voltage value of the output signal is greater than or equal to a second preset voltage threshold to stop output of the output signal, wherein the second preset voltage threshold is greater than the first preset voltage threshold.

In an embodiment of the present disclosure, it is provided an over-voltage protection device, comprising:

a voltage comparison circuit configured to determine whether a voltage value of an output signal is greater than a first preset voltage threshold;

a voltage detection circuit configured to detect, within a present time range, whether the voltage value of the output signal meets a preset over-voltage protection condition in the case that the voltage value of the output signal is greater than the first preset voltage threshold; and a control circuit configured to output a first control signal to stop output of the output signal or to lower the voltage value of the output signal in the case that it is detected, within the preset time range, that the voltage value of the output signal meets the preset over-voltage protection condition.

In an embodiment, the voltage detection circuit further comprises:

a first timing circuit configured to divide the preset time range into n counting cycles, where n is an integer greater than 1; and a first determining circuit configured to determine whether the voltage value of the output signal in each of the counting cycles is greater than the first preset voltage threshold and determine that the voltage value of the output signal meets the preset over-voltage protection condition in the case that the voltage value of the output signal in each of the counting cycles is greater than the first preset voltage threshold.

In an embodiment, the voltage detection circuit comprises:

a second timing circuit configured to divide the preset time range into n counting cycles, where n is an integer greater than one; and the second determining circuit configured to detect whether the voltage value of the output signal is greater than the first preset voltage threshold in each of the counting cycles, count the counting cycles, output a count signal indicating the number of the counting cycles during which the voltage value of the output signal is greater than the first preset voltage threshold, and determine that the voltage value of the output signal meets the preset over-voltage protection condition in the case that a value of the count signal is greater than a preset over-voltage period threshold.

In an embodiment, the over-voltage protection device is connected to a signal output circuit and configured to receive a voltage signal output from the signal output circuit and the first control signal is further configured to control the signal output circuit to trigger an over-voltage protection operation.

In an embodiment, the over-voltage protection device further comprises:

a switch circuit configured to receive the output signal, and output a second control signal in the case that the voltage value of the output signal is greater than or equal to a second preset voltage threshold to stop output of the output signal, wherein the second preset voltage threshold is greater than the first preset voltage threshold In an embodiment of the present disclosure, it is provided a display device, comprising:

a display panel;

a drive circuit; and an over-voltage protection device;

wherein the drive circuit comprises a power management chip, and the over-voltage protection device is connected with the power management chip;

wherein the over-voltage protection device comprises:

a voltage comparison circuit configured to determine whether a voltage value of an output signal is greater than a first preset voltage threshold;

a voltage detection circuit configured to detect, within a present time range, whether the voltage value of the output signal meets a preset over-voltage protection condition in the case that the voltage value of the output signal is greater than the first preset voltage threshold; and a control circuit configured to output a first control signal to stop output of the output signal or to lower the voltage value of the output signal in the case that it is detected, within the preset time range, that the voltage value of the output signal meets the preset over-voltage protection condition.

In the overvoltage protection method, the overvoltage protection device, and the display device according to the present disclosure, whether a voltage value of an output signal is greater than a first preset voltage threshold is determined, whether the voltage value of the output signal meets a preset over-voltage protection condition is detected within a preset time range if the voltage value of the output signal is greater than the first preset voltage threshold, and a first control signal to stop output of the output signal or to lower the voltage value of the output signal is output if it is detected, within the preset time range, that the voltage value of the output signal meets the preset over-voltage protection condition, so that the output signal will not be immediately stopped when the voltage value of the output signal is greater than the first preset voltage threshold. The output signal is stopped or lowered only when it is detected, within the preset time range that the voltage value of the output signal meets the preset over-voltage protection condition. Therefore, the problem in the existing over-voltage protection, that is, the voltage output is usually turned off after the output voltage exceeds the threshold voltage, and the false shutdown due to external noise interference cannot be avoided, which greatly affects the stability of the back-end circuit, can be solved.

BRIEF DESCRIPTION OF THE DRAWINGS

In order to more clearly illustrate the technical solutions in the embodiments of the present disclosure, the drawings used in the embodiments or the prior art description will be briefly described below. It is obvious that the drawings in the following description are only some embodiments of the present disclosure. To those skilled in the art, other drawings may be obtained from these drawings without paying any creative effort.

DESCRIPTION OF THE EMBODIMENTS

The technical solutions in the embodiments of the present disclosure will be clearly described in the following with reference to the accompanying drawings in the embodiments of the present disclosure. It is obvious that the embodiments to be described are just some instead of all embodiments of the present disclosure. All other embodiments obtained by those skilled in the art based on the embodiments of the present disclosure without paying any creative effort should be included within the protection scope of the present disclosure.

The term "comprise" and its variations in the specification, claims and above description of the drawings of the present disclosure are intended to cover non-exclusive inclusions. For example, a process, method or system, product or device including a series of steps or units is not limited to the listed steps or units, but optionally also includes steps or units not listed, or optionally also includes other steps or units inherent to the process, method, product or equipment. Moreover, the terms "first", "second" and "third," etc. are used to distinguish different objects, and are not intended to describe a particular order.

A display panel usually needs different power supply voltages according to various functions of the function circuits. These power supply voltages may be provided by A power management chip. In order to prevent the voltage output signal output from the power management chip from being too large, an over-current protection mechanism is arranged inside the power management chip. For example, a thin film transistor liquid crystal display panel requires a plurality of voltage signals with different voltage values. In order to provide a plurality of voltage signals for the thin film transistor liquid crystal display panel, a power management chip is usually used to provide different voltage output signals. In order to prevent excessive voltage output signal output from the power management chip from burning the thin film transistor liquid crystal display panel, an over-current protection mechanism is arranged inside the power management chip.

Figure 1:
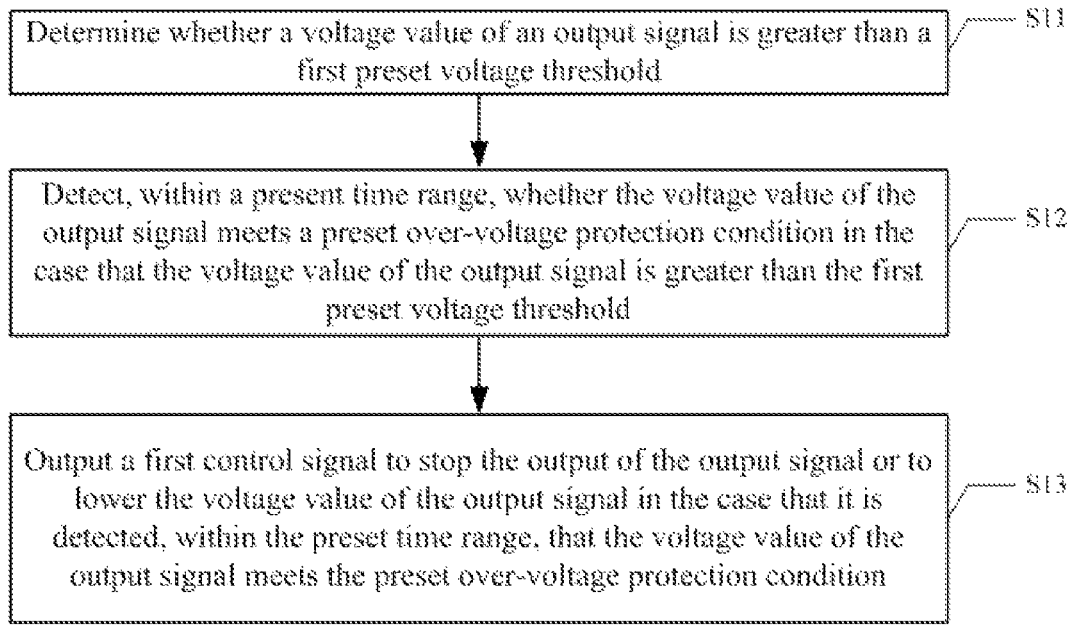
FIG. 1 is a schematic flow chart of an over-voltage protection method according to an embodiment of the present disclosure.

FIG. 1 is a schematic flow chart of an over-voltage protection method according to an embodiment of the present disclosure.

As shown in FIG. 1, the over-voltage protection method in this embodiment includes S11 to S13 as follows.

In S11, whether a voltage value of an output signal is greater than a first preset voltage threshold is determined.

In an embodiment, the voltage value of the output signal is obtained. Specifically, the output signal in this embodiment is an output signal of a voltage output circuit, and the voltage output circuit may include a voltage management chip. The output signal from a voltage output terminal is converted into a voltage value, and the voltage value is compared with a preset first preset voltage threshold so that a magnitude relationship between the voltage value and the preset first preset voltage threshold is determined.

In an embodiment, the first preset voltage threshold may be a safety threshold of the voltage signal output from the voltage output circuit, that is, when the voltage value of the voltage signal outputting from the voltage output circuit is greater than the safety threshold, the voltage output circuit may be burned. Specifically, the safety threshold may be determined according to the specific use environment or the model of the voltage output circuit.

S12, whether the voltage value of the output signal meets a preset over-voltage protection condition is detected within a preset time range in the case that the voltage value of the output signal is greater than the first preset voltage threshold.

In an embodiment, the voltage value of the output signal is detected, and the voltage value of the output signal is compared with the preset first preset voltage threshold. If the detected voltage value of the output signal is greater than the preset first preset voltage threshold, the voltage output signal is continuously detected within a preset time range after the voltage value of the output signal is detected to be greater than the preset first preset voltage threshold, so as to determine whether the voltage value of the output signal output meets the preset over-voltage protection condition within the preset time range. Specifically, the preset time range is a period of time after the voltage value of the output signal is greater than the first preset voltage threshold, that is, the period of time between the start of the timing and the end of the timing, where the timing starts when the voltage value of the output signal is detected to be greater than the first preset voltage threshold. The period of time between the start of the timing and the end of the timing is set according to the user's needs. For example, when the voltage value of the output signal is detected to be greater than the first preset voltage threshold, it is determined that the output signal is in an over-voltage state, the timing is started at this time, and the voltage value of the output signal is continuously detected within 5 seconds from the start of the timing so as to determine whether the voltage value of the output signal is always in an over-voltage state within 5 seconds from the start of the timing.

In an embodiment, the preset over-voltage protection condition may be set according to a user's needs. For example, the preset over-voltage protection condition is the voltage value of the output signal rises within the preset time range, and the rising may be continuously.

In an embodiment, the preset over-voltage protection condition is that the voltage value of the output signal rises linearly within the preset time range. If the voltage value of the output signal within the preset time range continuously rises, it can be determined that the voltage value of the output signal within the preset time range meets the preset over-voltage protection condition.

In an embodiment, the preset over-voltage condition is that the voltage value of the output signal within the preset time range is greater than the first preset voltage threshold all the time and remains unchanged, then it is determined that the voltage value of the output signal within the preset time range meets the preset over-voltage protection condition.

In an embodiment, when the voltage value of the output signal is less than or equal to the first preset voltage threshold, the output signal is normally output.

In an embodiment, the output signal is sampled at a preset time interval, and the voltage value of the output signal is detected. The voltage value is compared with the first preset voltage threshold. If the voltage value of the output signal is less than or equal to the first preset voltage threshold, the output signal is normally output, and the voltage value of the output signal is continuously sampled and determined at the preset time interval, and the process of sampling and determining the voltage value of the output signal has no effect on the output of the output signal. Only when the voltage value of the output signal is greater than the first preset voltage threshold, the next step, that is, determining whether the voltage value of the output signal meets the preset over-voltage protection condition within the preset time range after the voltage value of the output signal is greater than the first preset voltage threshold, is performed. In particular, the voltage value of the output signal is continuously sampled and determined within the preset time range after the voltage value of the output signal is greater than the first preset voltage threshold, and whether the continuously sampled voltage value meets the preset over-voltage protection condition is determined.

In S13, a first control signal to stop output of the output signal or to lower the voltage value of the output signal is output in the case that it is detected, within the preset time range, that the voltage value of the output signal meets the preset over-voltage protection condition.

In an embodiment, the voltage value of the output signal is continuously detected within the preset time range after the voltage value of the output signal is greater than the first preset voltage threshold. The detection process includes sampling the voltage value of the output signal and determining the magnitude relationship between the voltage value of the output signal and the first preset voltage threshold. The output signal includes a voltage output signal. By continuously sampling the voltage value of the output sign within the preset time range, a plurality of voltage values can be obtained, and whether the plurality of voltage values meet the preset over-voltage protection condition is determined. If the plurality of voltage values meet the preset over-voltage protection condition the first control signal is output. The first control signal is configured to stop output of the output signal or lower the voltage value of the voltage output signal.

For example, if the preset over-voltage protection condition is that the voltage value of the output signal continuously rises within the preset time range, it is determined whether the plurality of voltage values detected within the preset time range continuously rises over time is determined. If the plurality of voltage values continuously rise over time within the preset time range, it is determined that the plurality of voltage values meet the preset over-voltage protection condition, and the first control signal is output so as to stop output of the output signal or lower the voltage value of the output signal. Specifically, the mode of the control of the first control signal to the voltage output signal can be selected according to user's need.

In an embodiment, the preset over-voltage protection condition may be that the voltage value of the output signal remains unchanged within THE preset time range and is greater than the first preset voltage threshold. And the determination for the plurality of voltage values detected within the preset time range is performed to determine whether the plurality of voltage values are the same and greater than the first preset voltage threshold. If the plurality of voltage values detected within the preset time range are the same and greater than the first preset voltage threshold, the first control signal is output to control and adjust the output signal.

Figure 2:
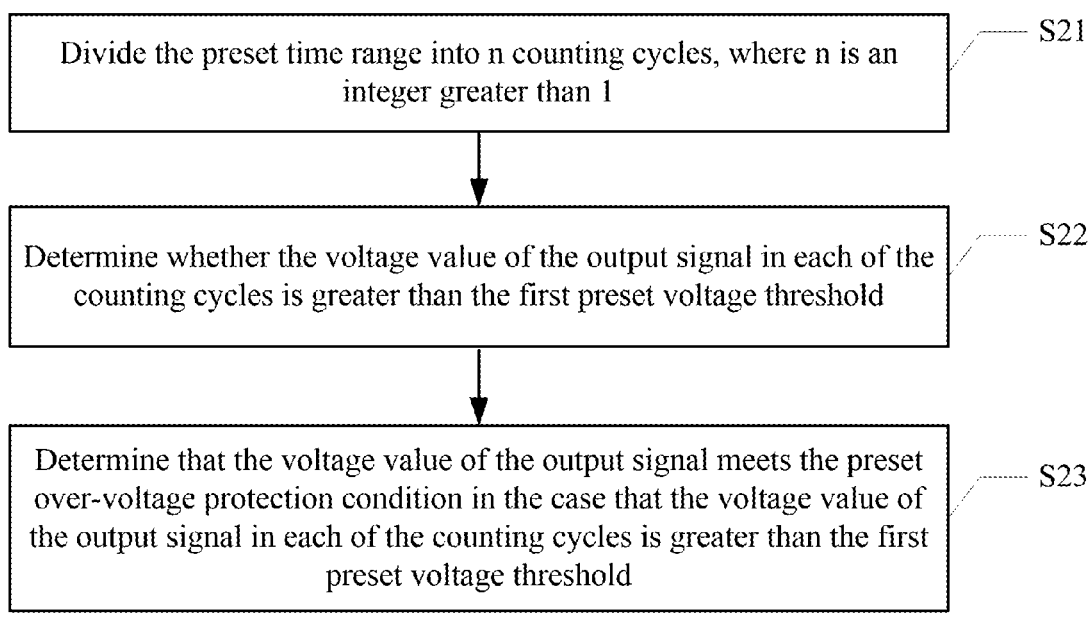
FIG. 2 is a schematic flow chart of an over-voltage protection method according to another embodiment of the present disclosure.

FIG. 2 is a schematic flow chart of an over-voltage protection method according to another embodiment of the present disclosure.

In this embodiment, detecting, within the present time range, whether the voltage value of the output signal meets the preset over-voltage protection condition in the case that the voltage value of the output signal is greater than the first preset voltage threshold is specialized. As shown in FIG. 2, the step of detecting, within a present time range, whether the voltage value of the output signal meets a preset over-voltage protection condition in the case that the voltage value of the output signal is greater than the first preset voltage threshold includes S21 to S23 as follows.

In S21, the preset time range is divided into n counting cycles, where n is an integer greater than 1.

In an embodiment, the timing is started since the voltage value of the output signal is greater than the first preset voltage threshold, and the preset time range from the start of the timing is divided into n counting cycles, where n is an integer greater than 1. For example, according to the user's need the preset time range is set to be 10 seconds, and the 10 seconds after the start of the timing when the voltage value of the output signal is greater than the first preset voltage threshold is divided into 10 counting cycles, each counting cycle being 1 second.

In S22, it is determined whether the voltage value of the output signal in each of the counting cycles is greater than the first preset voltage threshold.

In an embodiment, the voltage value of the output signal in each counting cycle is sampled and the magnitude relationship between the voltage value and the first preset voltage threshold is compared. For example, if the preset time range is set to 10 seconds, and the 10 seconds after the start of the timing when the voltage value of the output signal is greater than the first preset voltage threshold is divided into 10 counting cycles, where each counting cycle is 1 second, then the voltage value of the output signal is sampled once in each counting cycle of 1 second, and the voltage value sampled in each timing period is compared with the first preset voltage threshold to obtain a comparison result. As a result, 10 comparison results are obtained and whether the voltage values of the output signal, among the 10 comparison results, are greater than the first preset voltage threshold is determined.

In S23, it is determined that the voltage value of the output signal meets the preset over-voltage protection condition in the case that the voltage value of the output signal in each counting cycle is greater than the first preset voltage threshold.

In an embodiment, the preset over-voltage protection condition in this embodiment is that the voltage value of the output signal sampled in each counting cycle is greater than the first preset voltage threshold. Specifically, the comparison result detected in each timing period is determined. If the voltage value of the output signal is greater than the first preset voltage threshold in each timing cycle, it is determined that the voltage value of the output signal meets the preset over-voltage protection conditions.

Figure 3:
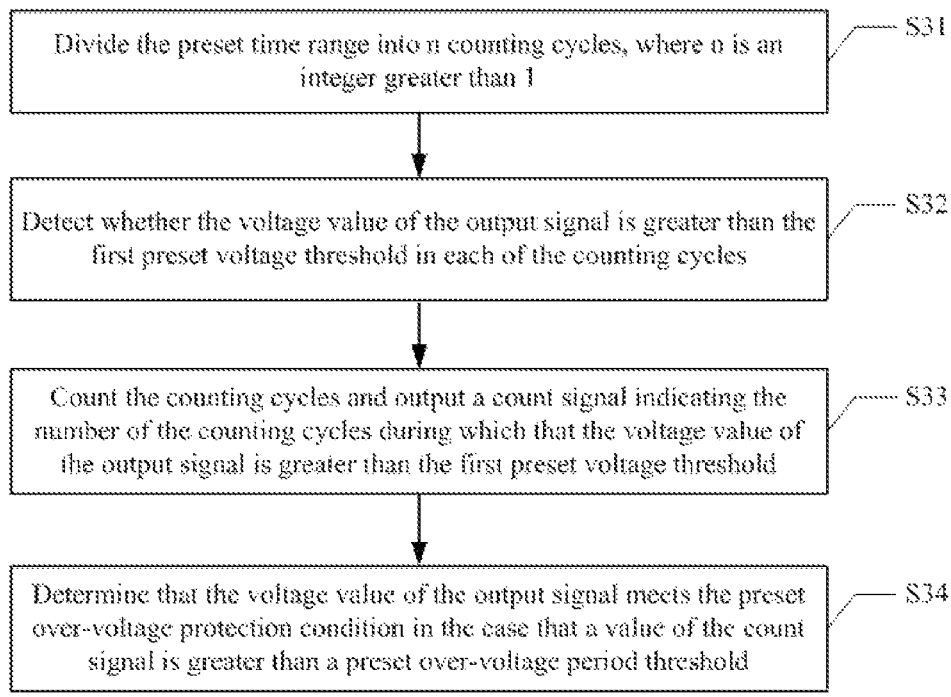
FIG. 3 is a schematic flow chart of an over-voltage protection method according to another embodiment of the present disclosure.

FIG. 3 is a schematic flow chart of an over-voltage protection method according to another embodiment of the present disclosure.

In this embodiment, the step of detecting, within the present time range, whether the voltage value of the output signal meets the preset over-voltage protection condition in the case that the voltage value of the output signal is greater than the first preset voltage threshold is specialized. As shown in FIG. 3, the step of detecting, within a present time range, whether the voltage value of the output signal meets a preset over-voltage protection condition in the case that the voltage value of the output signal is greater than the first preset voltage threshold includes S31 to S33 as follows.

In S31, the preset time range is divided into n counting cycles, where n is an integer greater than 1.

In S32, it is detected whether the voltage value of the output signal is greater than the first preset voltage threshold in each counting cycle.

In S33, the counting cycles are counted and a count signal indicating the number of the counting cycles during which the voltage value of the output signal is greater than the first preset voltage threshold is output.

In an embodiment, the timing is started since the voltage value of the output signal is greater than the first preset voltage threshold, and the preset time range from the start of the timing is divided into n counting cycles, where n is an integer greater than 1. The voltage value of the output signal is sampled once in each of the n counting cycles, and the voltage value sampled in each counting cycle is compared with the first preset voltage threshold so that a comparison result is obtained. Then, the comparison results obtained by the detection is counted, and a count signal is output, the count signal indicating the number of the counting cycles during which the voltage value is greater than the first preset voltage threshold in n counting cycles. For example, if the preset time range is set to 10 seconds according to the user's need, and the 10 seconds after starting the timing from the time when the voltage value of the output signal is greater than the first preset voltage threshold is divided into 10 counting cycles, where each counting cycle is 1 second. Comparing the voltage value of the output signal in each timing cycle with the first preset voltage threshold can obtain 10 comparison results. And then the number of comparison results, among the 10 comparison results, in which the voltage value of the output signal is greater than the first preset voltage threshold is determined. For example, if, among the 10 comparison results, only the voltage value of the output signal in 9 timing cycles is greater than the first preset voltage threshold, a corresponding count signal is output.

In S34, it is determined that the voltage value of the output signal meets the preset over-voltage protection condition in the case that the value of the count signal is greater than a preset over-voltage period threshold.

In an embodiment, the value of the count signal is compared with a preset over-voltage period threshold, and the voltage value of the output signal is determined to meet a preset over-voltage protection condition. Specifically, the preset over-voltage protection condition in this embodiment is that when the value of the count signal is greater than the preset over-voltage period threshold, it is determined that the voltage value of the output signal meets the preset over-voltage protection condition within the preset time range. Specifically, the preset over-voltage period threshold is set by the user and configured to be a critical safety threshold for determining the number of cycles in which the voltage value of the output signal is greater than the preset voltage threshold in the n counting cycles, that is, if, in n periods, the number of cycles in which the voltage value of the output signal is greater than the preset voltage threshold, it is determined that the voltage value of the output signal meets the preset over-voltage protection condition. For example, if in this embodiment the preset over-voltage period threshold is 8, if the voltage value of the output signal in 9 timing cycles, among the n cycles, is greater than the first preset voltage threshold, the value of the timing signal is greater than the preset over-voltage period threshold, it is therefore determined that the voltage value of the output signal meets the preset over-voltage protection condition within the preset time range, so as to avoid the detection error caused by the instantaneous fluctuation of the output signal within the preset time range from the time when the voltage value of the output signal is greater than the first preset voltage threshold.

In an embodiment, the output signal in this embodiment is a voltage signal output from a signal output circuit, and the first control signal is further configured to control the signal output circuit to trigger an over-voltage protection operation.

In an embodiment, the signal output circuit is internally provided with an over-voltage protection mechanism, and after receiving the trigger signal, the over-voltage protection mechanism is triggered to turn off the output of the voltage signal. The timing is started when the voltage value of the output signal is greater than the first preset voltage threshold. And if the voltage value of the output signal detected within the preset time range after the start of the timing meets the preset over-voltage protection condition the first control signal is output to the signal output circuit, and the first control signal can be used as the trigger signal to trigger the output circuit to initiate the over-voltage protection mechanism. Specifically, the signal output circuit may be a power management chip.

Figure 4:
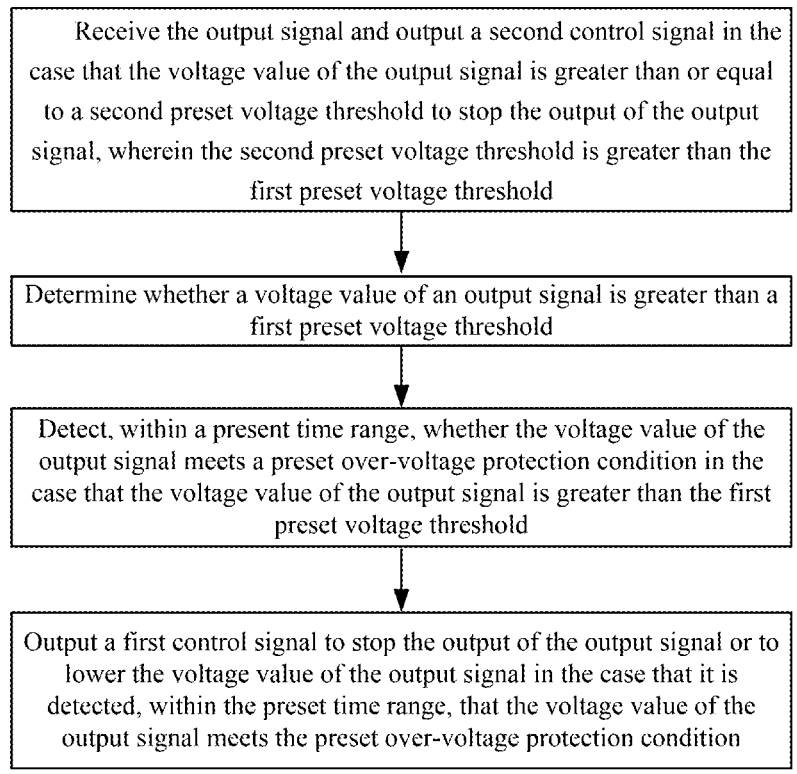
FIG. 4 is a schematic flow chart of an over-voltage protection method according to another embodiment of the present disclosure.

FIG. 4 is a schematic flow chart of an over-voltage protection method according to another embodiment of the present disclosure.

As shown in FIG. 4, the over-voltage protection method in this embodiment further includes:

receiving the output signal, and outputting the second control signal in the case that the voltage value of the output signal is greater than or equal to the second preset voltage threshold to stop output of the output signal, where the second preset voltage threshold is greater than the first preset voltage threshold.

In an embodiment, the output signal is received and the voltage value of the output signal is detected. The detection process includes a sampling process and a determination process. When the voltage value of the output signal is sampled, the voltage value is compared with the preset second preset voltage threshold. If the voltage value is greater than or equal to the second preset voltage threshold, the second control signal is output to stop output of the output signal, where the second preset voltage threshold is greater than the first preset voltage threshold. Thus it is avoided that when the output signal is beyond the tolerance of the back-end circuit, the voltage value of the output signal is still detected within the preset time range after the voltage value of the output signal is greater than the first preset voltage threshold, which causes the back-end circuit to burn out because the output signal cannot be turned off in time.

Figure 5:
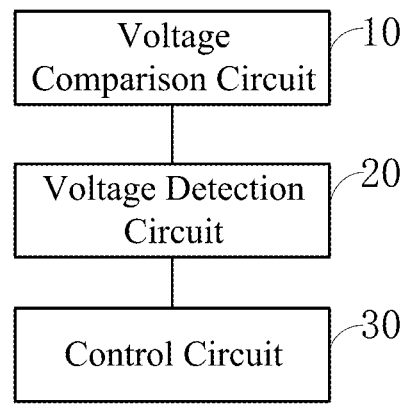
FIG. 5 is a schematic diagram of an over-voltage protection device according to an embodiment of the present disclosure.

FIG. 5 is a schematic diagram of an over-voltage protection device according to an embodiment of the present disclosure.

As shown in FIG. 5, the over-voltage protection device in this embodiment includes a voltage comparison circuit 10, a voltage detection circuit 20 and a control circuit 30.

The voltage comparison circuit 10 is configured to determine whether a voltage value of an output signal is greater than a first preset voltage threshold.

The voltage detection circuit 20 is configured to detect, within a preset time range, whether the voltage value of the output signal meets a preset over-voltage protection condition in the case that the voltage value of the output signal is greater than the first preset voltage threshold.

The control circuit 30 is configured to output a first control signal to stop output of the output signal or to lower the voltage value of the output signal in the case that it is detected, within the preset time range, that the voltage value of the output signal meets the preset over-voltage protection condition.

In one embodiment, the voltage comparison circuit 10 detects the voltage value of the output signal. Specifically, the output signal of the voltage output terminal is converted into a voltage value, and the voltage value is compared with a preset first preset voltage threshold to determine a magnitude relationship between the voltage value and the preset first preset voltage threshold.

The voltage detection circuit 20 detects whether the voltage value of the output signal meets the preset over-voltage protection condition. Specifically, the voltage value of the output signal is detected, and the voltage value of the output signal is compared with the preset first preset voltage threshold. If the detected voltage value of the output signal is greater than the preset first preset voltage threshold, the voltage output signal is continuously detected within a preset time range after the voltage value of the output signal is detected to be greater than the preset first preset voltage threshold, so as to determine whether the voltage value of the output signal output meets the preset over-voltage protection condition within the preset time range. The preset over-voltage protection condition may be set according to user's need. For example, the preset over-voltage protection condition is the voltage value of the output signal continuously rises or rises linearly within the preset time range. If the voltage value of the output signal continuously rises within the preset time range, it can be determined that the voltage value of the output signal within the preset time range meets the preset over-voltage protection condition. Or the preset over-voltage condition is that the voltage value of the output signal within the preset time range is greater than the first preset power threshold all the time and remains unchanged, then it is determined that the voltage value of the output signal within the preset time range meets the preset over-voltage protection condition.

In an embodiment, when the voltage value of the output signal detected by the voltage comparison circuit 10 is less than or equal to the first preset voltage threshold, the output signal is normally output. Specifically, the voltage comparison circuit 10 samples the output signal at a preset time interval and detects the voltage value of the output signal. The voltage value is compared with the first preset voltage threshold. If the voltage value of the output signal is less than or equal to the first preset voltage threshold, the output signal is normally output, and the voltage value of the output signal is continuously sampled and determined at the preset time interval, and the process of sampling and determining the voltage value of the output signal has no effect on the output of the output signal. Only when the voltage value of the output signal is greater than the first preset voltage threshold, the next step, that is, determining whether the voltage value of the output signal meets the preset over-voltage protection condition within the preset time range after the voltage value of the output signal is greater than the first preset voltage threshold, is performed. In particular, the voltage value of the output signal is continuously sampled and determined within the preset time range after the voltage value of the output signal is greater than the first preset voltage threshold, and whether the continuously sampled voltage value meets the preset over-voltage protection condition is determined.

In an embodiment, when the control circuit 30 outputs a first control signal to stop output of the output signal or to lower the voltage value of the output signal in the case that it is detected, within the preset time range, that the voltage value of the output signal meets the preset over-voltage protection condition.

In an embodiment, the voltage value of the output signal is continuously detected within the preset time range after the voltage value of the output signal is greater than the first preset voltage threshold. The detection process includes sampling the voltage value of the output signal and determining the magnitude relationship between the voltage value of the output signal and the first preset voltage threshold. The output signal includes a voltage output signal. By continuously sampling the voltage value of the output sign within the preset time range, a plurality of voltage values can be obtained, and whether the plurality of voltage values meet the preset over-voltage protection condition is determined. If the plurality of voltage values meet the preset over-voltage protection condition the first control signal is output. The first control signal is configured to stop output of the output signal or lower the voltage value of the voltage output signal.

For example, if the preset over-voltage protection condition is that the voltage value of the output signal continuously rises within the preset time range, it is determined whether the plurality of voltage values detected within the preset time range continuously rises over time is determined. If the plurality of voltage values continuously rise over time within the preset time range, it is determined that the plurality of voltage values meet the preset over-voltage protection condition, and the first control signal is output so as to stop output of the output signal or lower the voltage value of the output signal. Specifically, the mode of the control of the first control signal to the voltage output signal can be selected according to user's need. In an embodiment, the preset over-voltage protection condition may be that the voltage value of the output signal remains unchanged within THE preset time range and is greater than the first preset voltage threshold. And the determination for the plurality of voltage values detected within the preset time range is performed to determine whether the plurality of voltage values are the same and greater than the first preset voltage threshold. If the plurality of voltage values detected within the preset time range are the same and greater than the first preset voltage threshold, the first control signal is output to control and adjust the output signal.

Figure 6:
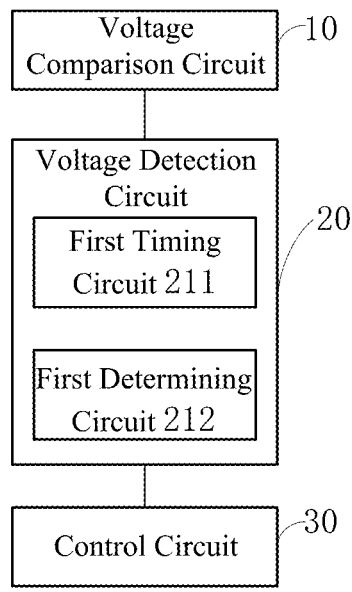
FIG. 6 is a schematic diagram of an over-voltage protection device according to another embodiment of the present disclosure.

FIG. 6 is a schematic diagram of an over-voltage protection device according to another embodiment of the present disclosure.

As shown in FIG. 6, the voltage detection circuit 20 includes a first timing circuit 211 and a first determining circuit 212.

The first timing circuit 211 is configured to divide the preset time range into n counting cycles, where n is an integer greater than one.

The first determining circuit 212 is configured to determine whether the voltage value of the output signal in each of the counting cycles is greater than the first preset voltage threshold and determine that the voltage value of the output signal meets the preset over-voltage protection condition in the case that the voltage value of the output signal in each counting cycle is greater than the first preset voltage threshold.

In an embodiment, the first timing circuit 211 starts the timing since the voltage value of the output signal is greater than the first preset voltage threshold, and the preset time range from the start of the timing is divided into n counting cycles, where n is an integer greater than 1. For example, according to the user's need the preset time range is set to be 10 seconds, and the 10 seconds after the start of the timing when the voltage value of the output signal is greater than the first preset voltage threshold is divided into 10 counting cycles, each counting cycle being 1 second. The first determining circuit 212 samples the voltage value of the output signal in each counting cycle and compares the magnitude relationship between the voltage value and the first preset voltage threshold. For example, if the preset time range is set to 10 seconds, and the 10 seconds after the start of the timing when the voltage value of the output signal is greater than the first preset voltage threshold is divided into 10 counting cycles, where each counting cycle is 1 second, then the voltage value of the output signal is sampled once in each counting cycle of 1 second, and the voltage value sampled in each timing period is compared with the first preset voltage threshold to obtain a comparison result. As a result, 10 comparison results are obtained and whether the voltage values of the output signal, among the 10 comparison results, are greater than the first preset voltage threshold is determined.

In an embodiment, the preset over-voltage protection condition in this embodiment is that the voltage value of the output signal sampled in each counting cycle is greater than the first preset voltage threshold. Specifically, the comparison result detected in each timing period is determined. If the voltage value of the output signal is greater than the first preset voltage threshold in each timing cycle, it is determined that the voltage value of the output signal meets the preset over-voltage protection conditions.

Figure 7:
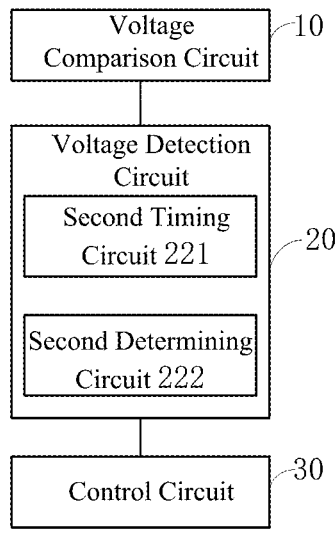
FIG. 7 is a schematic diagram of an over-voltage protection device according to another embodiment of the present disclosure.

FIG. 7 is a schematic diagram of an over-voltage protection device according to another embodiment of the present disclosure.

As shown in FIG. 7, the voltage detection circuit 20 includes a second timing circuit 221 and a second determining circuit 222.

The second timing circuit 221 is configured to divide the preset time range into n counting cycles, where n is an integer greater than 1.

The second determining circuit 222 is configured to detect whether the voltage value of the output signal is greater than the first preset voltage threshold in each counting cycle, count the counting cycles, output a count signal indicating the number of the counting cycles during which the voltage value of the output signal is greater than the first preset voltage threshold, and determines that the voltage value of the output signal meets the preset over-voltage protection condition in the case that the value of the count signal is greater than a preset over-voltage period threshold.

In one embodiment, the second timing circuit 221 the timing is started since the voltage value of the output signal is greater than the first preset voltage threshold, and the preset time range from the start of the timing is divided into n counting cycles, where n is an integer greater than 1. The voltage value of the output signal is sampled once in each of the n counting cycles, and the voltage value sampled in each counting cycle is compared with the first preset voltage threshold so that a comparison result is obtained. Then, the comparison results obtained by the detection is counted, and a count signal is output, the count signal indicating the number of the counting cycles during which the voltage value is greater than the first preset voltage threshold in n counting cycles. For example, if the preset time range is set to 10 seconds according to the user's need, and the 10 seconds after starting the timing from the time when the voltage value of the output signal is greater than the first preset voltage threshold is divided into 10 counting cycles, where each counting cycle is 1 second. Comparing the voltage value of the output signal in each timing cycle with the first preset voltage threshold can obtain 10 comparison results. And then the number of comparison results, among the 10 comparison results, in which the voltage value of the output signal is greater than the first preset voltage threshold is determined. For example, if, among the 10 comparison results, only the voltage value of the output signal in 9 timing cycles is greater than the first preset voltage threshold, a corresponding count signal is output. The second determining circuit 222 compares the value of the count signal with a preset over-voltage period threshold, and determines the voltage value of the output signal meets a preset over-voltage protection condition. Specifically, the preset over-voltage protection condition in this embodiment is that when the value of the count signal is greater than the preset over-voltage period threshold, it is determined that the voltage value of the output signal meets the preset over-voltage protection condition within the preset time range. For example, if in this embodiment the preset over-voltage period threshold is 8, if the voltage value of the output signal in 9 timing cycles is greater than the first preset voltage threshold, the value of the timing signal is greater than the preset over-voltage period threshold, it is therefore determined that the voltage value of the output signal meets the preset over-voltage protection condition within the preset time range, so as to avoid the detection error caused by the instantaneous fluctuation of the output signal within the preset time range from the time when the voltage value of the output signal is greater than the first preset voltage threshold.

In an embodiment, the over-voltage protection device is connected to the signal output circuit and configured to receive the voltage signal output from the signal output circuit and the first control signal is further configured to control the signal output circuit to trigger the over-voltage protection operation.

In an embodiment, the signal output circuit is configured to output a voltage signal, i.e., the output signal described in the above embodiments. In an embodiment, the signal output circuit may be a power management chip.

Figure 8:
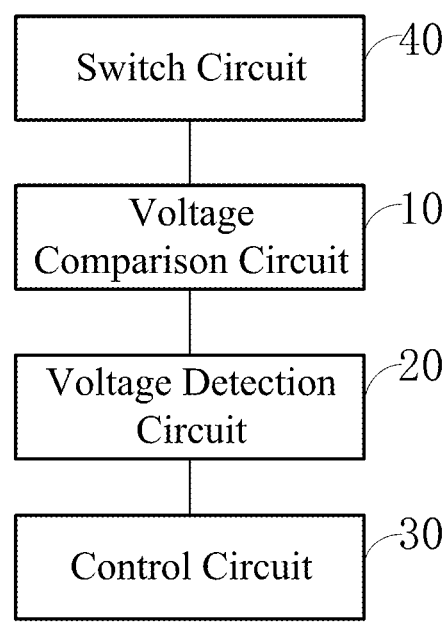
FIG. 8 is a schematic diagram of an over-voltage protection device according to another embodiment of the present disclosure.

FIG. 8 is a schematic diagram of an over-voltage protection device according to another embodiment of the present disclosure.

As shown in FIG. 8, the over-voltage protection device further includes a switch circuit 40.

The switch circuit 40 is configured to receive the output signal, and output the second control signal if the voltage value of the output signal is greater than or equal to the second preset voltage threshold to stop output of the output signal, where the second preset voltage threshold is greater than the first preset voltage threshold.

In an embodiment, the switch circuit 40 receives the output signal and detects the voltage value of the output signal. The detection process includes a sampling process and a determination process. When the voltage value of the output signal is sampled, the voltage value is compared with the preset second preset voltage threshold. If the voltage value is greater than or equal to the second preset voltage threshold, the second control signal is output to stop output of the output signal, where the second preset voltage threshold is greater than the first preset voltage threshold. Thus it is avoided that when the output signal is beyond the tolerance of the back-end circuit, the voltage value of the output signal is still detected within the preset time range after the voltage value of the output signal is greater than the first preset voltage threshold, which causes the back-end circuit to burn out because the output signal cannot be turned off in time.

In an embodiment of the present disclosure, it is provided a display device, includes a display panel, a drive circuit and an over-voltage protection device.

The drive circuit includes a power management chip, and the over-voltage protection device is connected to the power management chip.

The over-voltage protection device includes a voltage comparison circuit 10, a voltage detection circuit 20 and a control circuit 30.

The voltage comparison circuit 10 is configured to determine whether a voltage value of an output signal is greater than a first preset voltage threshold.

The voltage detection circuit 20 is configured to detect, within a preset time range, whether the voltage value of the output signal meets a preset over-voltage protection condition in the case that the voltage value of the output signal is greater than the first preset voltage threshold.

The control circuit 30 is configured to output a first control signal to stop output of the output signal or to lower the voltage value of the output signal in the case that it is detected, within the preset time range, that the voltage value of the output signal meets the preset over-voltage protection condition.

In an embodiment, the display device may be any type of display device provided with the above-mentioned over-voltage protection device, such as a liquid crystal display (LCD), an organic electroluminescence display (OLED) device, a quantum dot light emitting diodes (QLED) display device or a curved display device.

In an embodiment, the display panel includes a pixel array consisting of a plurality of rows of pixels and a plurality of columns of pixels.

In an embodiment, the voltage comparison circuit 10 detects the voltage value of the output signal. Specifically, the output signal of the voltage output terminal is converted into a voltage value, and the voltage value is compared with a preset first preset voltage threshold to determine a magnitude relationship between the voltage value and the preset first preset voltage threshold.

The voltage detection circuit 20 detects whether the voltage value of the output signal meets the preset over-voltage protection condition. Specifically, the voltage value of the output signal is detected, and the voltage value of the output signal is compared with the preset first preset voltage threshold. If the detected voltage value of the output signal is greater than the preset first preset voltage threshold, the voltage output signal is continuously detected within a preset time range after the voltage value of the output signal is detected to be greater than the preset first preset voltage threshold, so as to determine whether the voltage value of the output signal output meets the preset over-voltage protection condition within the preset time range. The preset over-voltage protection condition may be set according to user's need. For example, the preset over-voltage protection condition is the voltage value of the output signal continuously rises or rises linearly within the preset time range. If the voltage value of the output signal continuously rises within the preset time range, it can be determined that the voltage value of the output signal within the preset time range meets the preset over-voltage protection condition. Or the preset over-voltage condition is that the voltage value of the output signal within the preset time range is greater than the first preset power threshold all the time and remains unchanged, then it is determined that the voltage value of the output signal within the preset time range meets the preset over-voltage protection condition.

In an embodiment, when the voltage value of the output signal detected by the voltage comparison circuit 10 is less than or equal to the first preset voltage threshold, the output signal is normally output. Specifically, the voltage comparison circuit 10 samples the output signal at a preset time interval and detects the voltage value of the output signal. The voltage value is compared with the first preset voltage threshold. If the voltage value of the output signal is less than or equal to the first preset voltage threshold, the output signal is normally output, and the voltage value of the output signal is continuously sampled and determined at the preset time interval, and the process of sampling and determining the voltage value of the output signal has no effect on the output of the output signal. Only when the voltage value of the output signal is greater than the first preset voltage threshold, the next step, that is, determining whether the voltage value of the output signal meets the preset over-voltage protection condition within the preset time range after the voltage value of the output signal is greater than the first preset voltage threshold, is performed. In particular, the voltage value of the output signal is continuously sampled and determined within the preset time range after the voltage value of the output signal is greater than the first preset voltage threshold, and whether the continuously sampled voltage value meets the preset over-voltage protection condition is determined.

In an embodiment, when the control circuit 30 outputs a first control signal to stop output of the output signal or to lower the voltage value of the output signal in the case that it is detected, within the preset time range, that the voltage value of the output signal meets the preset over-voltage protection condition.

In an embodiment, the voltage value of the output signal is continuously detected within the preset time range after the voltage value of the output signal is greater than the first preset voltage threshold. The detection process includes sampling the voltage value of the output signal and determining the magnitude relationship between the voltage value of the output signal and the first preset voltage threshold. The output signal includes a voltage output signal. By continuously sampling the voltage value of the output sign within the preset time range, a plurality of voltage values can be obtained, and whether the plurality of voltage values meet the preset over-voltage protection condition is determined. If the plurality of voltage values meet the preset over-voltage protection condition the first control signal is output. The first control signal is configured to stop output of the output signal or lower the voltage value of the voltage output signal.

For example, if the preset over-voltage protection condition is that the voltage value of the output signal continuously rises within the preset time range, it is determined whether the plurality of voltage values detected within the preset time range continuously rises over time is determined. If the plurality of voltage values continuously rise over time within the preset time range, it is determined that the plurality of voltage values meet the preset over-voltage protection condition, and the first control signal is output so as to stop output of the output signal or lower the voltage value of the output signal. Specifically, the mode of the control of the first control signal to the voltage output signal can be selected according to user's need. In an embodiment, the preset over-voltage protection condition may be that the voltage value of the output signal remains unchanged within THE preset time range and is greater than the first preset voltage threshold. And the determination for the plurality of voltage values detected within the preset time range is performed to determine whether the plurality of voltage values are the same and greater than the first preset voltage threshold. If the plurality of voltage values detected within the preset time range are the same and greater than the first preset voltage threshold, the first control signal is output to control and adjust the output signal.

FIG. 6 is a schematic diagram of an over-voltage protection device according to another embodiment of the present disclosure.

As shown in FIG. 6, the voltage detection circuit 20 includes a first timing circuit 211 and a first determining circuit 212.

The first timing circuit 211 is configured to divide the preset time range into n counting cycles, where n is an integer greater than one.

The first determining circuit 212 is configured to determine whether the voltage value of the output signal in each of the counting cycles is greater than the first preset voltage threshold and determine that the voltage value of the output signal meets the preset over-voltage protection condition in the case that the voltage value of the output signal in each counting cycle is greater than the first preset voltage threshold.

In an embodiment, the first timing circuit 211 starts the timing since the voltage value of the output signal is greater than the first preset voltage threshold, and the preset time range from the start of the timing is divided into n counting cycles, where n is an integer greater than 1. For example, according to the user's need the preset time range is set to be 10 seconds, and the 10 seconds after the start of the timing when the voltage value of the output signal is greater than the first preset voltage threshold is divided into 10 counting cycles, each counting cycle being 1 second. The first determining circuit 212 samples the voltage value of the output signal in each counting cycle and compares the magnitude relationship between the voltage value and the first preset voltage threshold. For example, if the preset time range is set to 10 seconds, and the 10 seconds after the start of the timing when the voltage value of the output signal is greater than the first preset voltage threshold is divided into 10 counting cycles, where each counting cycle is 1 second, then the voltage value of the output signal is sampled once in each counting cycle of 1 second, and the voltage value sampled in each timing period is compared with the first preset voltage threshold to obtain a comparison result. As a result, 10 comparison results are obtained and whether the voltage values of the output signal, among the 10 comparison results, are greater than the first preset voltage threshold is determined.

In an embodiment, the preset over-voltage protection condition in this embodiment is that the voltage value of the output signal sampled in each counting cycle is greater than the first preset voltage threshold. Specifically, the comparison result detected in each timing period is determined. If the voltage value of the output signal is greater than the first preset voltage threshold in each timing cycle, it is determined that the voltage value of the output signal meets the preset over-voltage protection conditions.

FIG. 7 is a schematic diagram of an over-voltage protection device according to another embodiment of the present disclosure.

As shown in FIG. 7, the voltage detection circuit 20 includes a second timing circuit 221 and a second determining circuit 222.

The second timing circuit 221 is configured to divide the preset time range into n counting cycles, where n is an integer greater than 1.

The second determining circuit 222 is configured to detect whether the voltage value of the output signal is greater than the first preset voltage threshold in each counting cycle, count the counting cycles, output a count signal indicating the number of the counting cycles during which the voltage value of the output signal is greater than the first preset voltage threshold, and determines that the voltage value of the output signal meets the preset over-voltage protection condition in the case that the value of the count signal is greater than a preset over-voltage period threshold.

In one embodiment, the second timing circuit 221 the timing is started since the voltage value of the output signal is greater than the first preset voltage threshold, and the preset time range from the start of the timing is divided into n counting cycles, where n is an integer greater than 1. The voltage value of the output signal is sampled once in each of the n counting cycles, and the voltage value sampled in each counting cycles is compared with the first preset voltage threshold so that a comparison result is obtained. Then, the comparison results obtained by the detection is counted, and a count signal is output, the count signal indicating the number of the counting cycles during which the voltage value is greater than the first preset voltage threshold in n counting cycles. For example, if the preset time range is set to 10 seconds according to the user's need, and the 10 seconds after starting the timing from the time when the voltage value of the output signal is greater than the first preset voltage threshold is divided into 10 counting cycles, where each counting cycle is 1 second. Comparing the voltage value of the output signal in each timing cycle with the first preset voltage threshold can obtain 10 comparison results. And then the number of comparison results, among the 10 comparison results, in which the voltage value of the output signal is greater than the first preset voltage threshold is determined. For example, if, among the 10 comparison results, only the voltage value of the output signal in 9 timing cycles is greater than the first preset voltage threshold, a corresponding count signal is output. The second determining circuit 222 compares the value of the count signal with a preset over-voltage period threshold, and determines the voltage value of the output signal meets a preset over-voltage protection condition. Specifically, the preset over-voltage protection condition in this embodiment is that when the value of the count signal is greater than the preset over-voltage period threshold, it is determined that the voltage value of the output signal meets the preset over-voltage protection condition within the preset time range. For example, if in this embodiment the preset over-voltage period threshold is 8, if the voltage value of the output signal in 9 timing cycles is greater than the first preset voltage threshold, the value of the timing signal is greater than the preset over-voltage period threshold, it is therefore determined that the voltage value of the output signal meets the preset over-voltage protection condition within the preset time range, so as to avoid the detection error caused by the instantaneous fluctuation of the output signal within the preset time range from the time when the voltage value of the output signal is greater than the first preset voltage threshold.

In an embodiment, the over-voltage protection device is connected to the signal output circuit and configured to receive the voltage signal output from the signal output circuit and the first control signal is further configured to control the signal output circuit to trigger the over-voltage protection operation.

In an embodiment, the circuit in the above described embodiments may be a central processing unit (CPU), or may be another general-purpose processor, a digital signal processor (DSP), an application specific integrated circuit (ASIC), a field-programmable gate array (FPGA) or other programmable logic device, discrete gate or transistor logic device, discrete hardware component, etc.

In an embodiment, the general-purpose processor may be a microprocessor or the processor may be any conventional processor or the like.

The above descriptions are only optional embodiments of the present disclosure, and are not intended to limit the present disclosure. Any modifications, equivalent substitutions and improvements made within the spirit and principles of the present disclosure are included in the protection scope of the present disclosure.

What is claimed is:

1. An over-voltage protection method, comprising:
 determining whether a voltage value of an output signal is greater than a first preset voltage threshold;
 detecting, within a present time range, whether the voltage value of the output signal meets a preset overvoltage protection condition in response to determining that the voltage value of the output signal is greater than the first preset voltage threshold; and outputting a first control signal to stop output of the output signal or to lower the voltage value of the output signal in response to detecting, within the preset time range, that the voltage value of the output signal meets the preset over-voltage protection condition;

wherein the operation of detecting, within a present time range, whether the voltage value of the output signal meets a preset over-voltage protection condition comprises:

dividing the preset time range into a number of n counting cycles, where n is an integer greater than 1;

detecting whether the voltage value of the output signal is greater than the first preset voltage threshold in each of the counting cycles;

counting the counting cycles and outputting a count signal indicative of the number of the counting cycles during which the voltage value of the output signal is greater than the first preset voltage threshold; and determining that the voltage value of the output signal meets the preset over-voltage protection condition in response to determining that a value of the count signal is greater than a preset over-voltage period threshold.

2. The over-voltage protection method of claim 1, wherein the output signal is a voltage signal output from a signal output circuit, and the first control signal is further configured to control the signal output circuit to trigger an over-voltage protection operation.

3. The over-voltage protection method of claim 2, wherein triggering an over-voltage protection operation comprises:
stopping the output of the output signal.

4. The over-voltage protection method of claim 1, wherein the over-voltage protection method further comprises:
receiving the output signal; and
outputting a second control signal in response to determining that the voltage value of the output signal is greater than or equal to a second preset voltage threshold to stop output of the output signal, wherein the second preset voltage threshold is greater than the first preset voltage threshold.

5. An over-voltage protection device, comprising:
a voltage comparison circuit configured to determine whether a voltage value of an output signal is greater than a first preset voltage threshold;
a voltage detection circuit configured to detect, within a present time range, whether the voltage value of the output signal meets a preset over-voltage protection condition in response to determining that the voltage value of the output signal is greater than the first preset voltage threshold; and
a control circuit configured to output a first control signal to stop output of the output signal or to lower the voltage value of the output signal in response to detecting, within the preset time range, that the voltage value of the output signal meets the preset over-voltage protection condition;
wherein the voltage detection circuit comprises a timing circuit configured to:
divide the preset time range into a number of n counting cycles, where n is an integer greater than one; and
detect whether the voltage value of the output signal is greater than the first preset voltage threshold in each of the counting cycles, count a number of the counting cycles, output a count signal indicative of the number of the counting cycles during which the voltage value of the output signal is greater than the first preset voltage threshold, and determining that the voltage value of the output signal meets the preset over-voltage protection condition in response to determining that a value of the count signal is greater than a preset over-voltage period threshold.

6. The over-voltage protection device of claim 5, wherein the over-voltage protection device is connected to a signal output circuit and configured to receive a voltage signal output from the signal output circuit and the first control signal is further configured to control the signal output circuit to trigger an over-voltage protection operation.

7. The over-voltage protection device of claim 6, wherein the first control signal is further configured to control the signal output circuit to stop output of the output signal.

8. The over-voltage protection device of claim 6, wherein the signal output circuit is a power management chip.

9. The over-voltage protection device of claim 5, wherein the over-voltage protection device further comprises:
a switch circuit configured to receive the output signal, and output a second control signal in response to determining that the voltage value of the output signal is greater than or equal to a second preset voltage threshold to stop output of the output signal, wherein the second preset voltage threshold is greater than the first preset voltage threshold.

10. A display device, comprising:
a display panel;
a drive circuit; and
an over-voltage protection device;
wherein the drive circuit comprises a power management chip, and the over-voltage protection device is connected with the power management chip;
wherein the over-voltage protection device comprises:
a voltage comparison circuit configured to determine whether a voltage value of an output signal is greater than a first preset voltage threshold;
a voltage detection circuit configured to detect, within a present time range, whether the voltage value of the output signal meets a preset over-voltage protection condition in response to determining that the voltage value of the output signal is greater than the first preset voltage threshold; and
a control circuit configured to output a first control signal to stop output of the output signal or to lower the voltage value of the output signal in response to detecting, within the preset time range, that the voltage value of the output signal meets the preset over-voltage protection condition;
wherein the voltage detection circuit comprises a timing circuit configured to:
divide the preset time range into a number of n counting cycles, where n is an integer greater than one; and
detect whether the voltage value of the output signal is greater than the first preset voltage threshold in each of the counting cycles, count a number of the counting cycles, output a count signal indicative of the number of the counting cycles during which the voltage value of the output signal is greater than the first preset voltage threshold, and determining that the voltage value of the output signal meets the preset over-voltage protection condition in response to determining that a value of the count signal is greater than a preset over-voltage period threshold.

* * * * *